US008830260B2

(12) United States Patent
Ogasawara et al.

(10) Patent No.: US 8,830,260 B2
(45) Date of Patent: Sep. 9, 2014

(54) DRAWING DEVICE OF MOVE-TARGET IMAGE AND DISPLAY SYSTEM FOR VEHICLE

(75) Inventors: Kazuyoshi Ogasawara, Susono (JP); Katsuhiko Iwazaki, Susono (JP)

(73) Assignee: Yazaki Corporation, Tokyo (JP)

( * ) Notice: Subject to any disclaimer, the term of this patent is extended or adjusted under 35 U.S.C. 154(b) by 295 days.

(21) Appl. No.: 13/133,015

(22) PCT Filed: Dec. 8, 2009

(86) PCT No.: PCT/JP2009/070569
§ 371 (c)(1),
(2), (4) Date: Jun. 6, 2011

(87) PCT Pub. No.: WO2010/067807
PCT Pub. Date: Jun. 17, 2010

(65) Prior Publication Data
US 2011/0235943 A1    Sep. 29, 2011

(30) Foreign Application Priority Data
Dec. 8, 2008    (JP) ................................. 2008-312051

(51) Int. Cl.
*G09G 5/00* (2006.01)
*G01D 11/28* (2006.01)
*G01D 7/00* (2006.01)

(52) U.S. Cl.
CPC . *G01D 7/00* (2013.01); *G01D 11/28* (2013.01)
USPC ......................................... 345/619; 345/690

(58) Field of Classification Search
USPC .............. 345/619, 690, 76, 89, 440; 340/438, 340/462
See application file for complete search history.

(56) References Cited

U.S. PATENT DOCUMENTS 7,321,294 B2    1/2008   Mizumaki
7,965,315 B2    6/2011   Jang
(Continued)

FOREIGN PATENT DOCUMENTS

CN              1691098 A    11/2005
(Continued)

OTHER PUBLICATIONS

International Search Report for PCT/JP2009/070569 dated Mar. 16, 2010 [PCT/ISA/210].

(Continued)

*Primary Examiner* — Chante Harrison
(74) *Attorney, Agent, or Firm* — Sughrue Mion, PLLC

(57) ABSTRACT

Afterimages of a move-target image which is moved at high speed are reduced even if a display unit with slow response characteristics is used. A drawing device for continuously drawing a move-target image as a moving picture on a display image displayed on a display unit includes: a drawing position identification unit which identifies a current drawing position at which the move-target image is drawn on the display screen; a past drawing position storage unit in which is stored a prescribed number of past drawing positions where the move-target image is drawn previously; an afterimage-reducing region detection unit which detects an afterimage-reducing region of the move-target image, the afterimage reducing region extending from the current drawing position to any one of the past drawing positions; an afterimage-reducing image drawing unit which draws an afterimage-reducing image in the afterimage reducing region; and a move-target image drawing unit which draws the move-target image at the current drawing position.

7 Claims, 6 Drawing Sheets

(56) References Cited

U.S. PATENT DOCUMENTS

| | | | |
|---|---|---|---|
| 2005/0237171 A1 | 10/2005 | Mizumaki | |
| 2005/0280521 A1 | 12/2005 | Mizumaki | |
| 2007/0177058 A1 | 8/2007 | Jang | |
| 2007/0285388 A1 | 12/2007 | Ogasawara | |
| 2007/0296724 A1 | 12/2007 | Katoh et al. | |
| 2009/0267753 A1* | 10/2009 | Kim | 340/462 |
| 2010/0085280 A1* | 4/2010 | Lambert et al. | 345/76 |
| 2010/0103204 A1* | 4/2010 | Shibata et al. | 345/690 |
| 2010/0238008 A1* | 9/2010 | Hamachi et al. | 340/438 |
| 2011/0090074 A1* | 4/2011 | Kuno et al. | 340/438 |
| 2011/0227942 A1* | 9/2011 | Fujimoto et al. | 345/619 |

FOREIGN PATENT DOCUMENTS

| | | | |
|---|---|---|---|
| CN | 101009077 A | 8/2007 | |
| JP | 2003-262542 A | 9/2003 | |
| JP | 2006-010325 A | 1/2006 | |
| JP | 2007-309709 A | 11/2007 | |
| JP | 2007-309719 A | 11/2007 | |
| JP | 2008-008637 A | 1/2008 | |

OTHER PUBLICATIONS

Communication dated Jan. 30, 2013 from the State Intellectual Property Office of P.R. China in a counterpart application No. 200980148824.0

Office Action, dated Aug. 30, 2013, issued by the State Intellectual Property Office of the People's Republic of China, in counterpart Application No. 200980148824.0

* cited by examiner

DRAWING DEVICE OF MOVE-TARGET IMAGE AND DISPLAY SYSTEM FOR VEHICLE

TECHNICAL FIELD

The present invention relates to a drawing device for drawing a move-target image as a moving picture on a display image, and a display system for a vehicle having the drawing device for drawing the move-target image.

BACKGROUND ART

As shown in Patent Literature 1, for example, it is known that a graphic meter of a related art uses "motion blur" for graphic display in order to create an image of moving fast by skipping a lot of pieces of images when an image which moves fast is to be displayed. However, the display of motion blur is used in a case of a rotational speed at which a movement of a pointer is substantially invisible. In a case of a rotational speed at which the pointer is visible by some measures, the display is switched to a normal pointer display.

Applicant or Assignee has proposed a graphic meter shown in Patent Literature 2. This graphic meter generates a motion blur pointer image in a trapezoidal shape in which sides of ends of the pointer image are considered as opposite sides, and reduces unevenness of luminance by not overlapping the normal pointer image with the motion blur pointer image.

CITATION LIST

Patent Literature

Patent Literature 1: JP-A-2003-262542
Patent Literature 2: JP-A-2007-309709

SUMMARY OF INVENTION

Technical Problem

In a case of drawing a pointer image which moves at high speed, however, if a response of a display device such as a liquid crystal or an EL (Electro Luminescence) is slow, the pointer image to be erased which fades away after the drawing can be viewed as an afterimage. As a result, a new pointer image and the pointer image to be erased are viewed at the same time, then there arises a problem to cause a feeling of strangeness and a flicker to the user. This problem occurs in a device for drawing a pointer image which cannot use a display device having a quick response due to the cost problem, etc. This problem is not limited to a pointer image, but is also applied for a move-target image such as a directions image, or moving picture image.

In consideration of the above problem, a technical problem of the present invention is to provide a device for drawing a move-target image (hereinafter, may be called "drawing device" merely by abbreviation) capable of reducing an afterimage of the move-target image which moves at high speed even if a display unit having slow response is used.

Solution to Problem

In order to achieve the problem, a drawing device according a first aspect of the invention corresponds to a drawing device for continuously drawing a move-target image as a moving picture on a display image displayed on a display unit, the drawing device including: a drawing position identification unit which is configured to identify a current drawing position at which the move-target image is drawn on the display screen; a past drawing position storage unit in which is stored a prescribed number of past drawing positions where the move-target image is drawn previously; an afterimage-reducing region detection unit which is configured to detect an afterimage-reducing region of the move-target image, the afterimage reducing region extending from the current drawing position to any one of the past drawing positions; an afterimage-reducing image drawing unit which is configured to draw an afterimage-reducing image in the afterimage reducing region; and a move-target image drawing unit which is configured to draw the move-target image at the current drawing position.

According to the drawing device in the first aspect, the drawing position identification unit identifies the current drawing position of the move-target image in the display screen in response to drawing the move-target image. The past drawing position storage unit stores the previous or the plural number of drawing of the past drawing positions. The afterimage-reducing region detection unit detects the afterimage-reducing region of the move-target image from the current drawing position to any of the past drawing positions. The afterimage-reducing image drawing unit draws the afterimage-reducing image such as a background image or a cancellation image in the detected afterimage-reducing region. Then, the move-target image drawing unit draws the move-target image at the drawing position. Accordingly, the region in which the move-target image has been drawn in the past is regarded as the afterimage-reducing region, and the afterimage-reducing image can be displayed in the afterimage-reducing region.

In the drawing device according to a second aspect of the invention, the drawing device of the first aspect includes a previous move-target image erasing unit which is configured to erase a previous move-target image in accordance with an identification of the current drawing position performed by the drawing position identification unit.

According to the drawing device in the second aspect, when the drawing position identification unit identifies the current drawing position, the previous move-target image erasing unit erases the previous move-target image. Accordingly, it is possible to prevent that the past move-target image is viewed as an afterimage even in the display unit having a slow response drawing.

In the drawing device according to a third aspect of the invention, the drawing device of the first or second aspect includes an afterimage-reducing region dividing unit which is configured to divide the afterimage-reducing region into a plurality of afterimage-reducing divided regions on the basis of the plurality of stored past drawing positions, and the afterimage-reducing image drawing unit draws each of divided afterimage-reducing images to be drawn in the plurality of afterimage-reducing divided regions so that its gradation is reduced step-by-step as it gets away from the move-target image.

According to the drawing device in the third aspect, the afterimage-reducing region dividing unit divides the afterimage-reducing region into the plurality of afterimage-reducing divided regions on the basis of the plurality of past drawing positions. Then, the afterimage-reducing image drawing unit draws each of the divided afterimage-reducing images to be drawn in the plurality of afterimage-reducing divided regions so that its gradation is reduced step-by-step as it gets away from the move-target image. Accordingly, it is possible to easily recognize the moving direction and the drawing position of the move-target image.

In the drawing device according to a fourth aspect of the invention, the drawing device of the third aspect is configured so that the move-target image is an image which indicates a display of rotating a pointer, and the afterimage-reducing image drawing unit draws each of divided afterimage-reducing images to be drawn in the plurality of afterimage-reducing divided regions so that its gradation is reduced gradually as it comes close to a rotational center of the pointer.

According to the drawing device in the fourth aspect, the afterimage-reducing image drawing unit draws each of the divided afterimage-reducing images to be drawn in the plurality of afterimage-reducing divided regions so that its gradation is reduced gradually as it comes close to a rotational center of the pointer. Accordingly, it is possible to reduce the load of drawing process closer to the rotational center of the pointer.

In order to achieve the problem, a display system for a vehicle according a fifth aspect of the invention includes the drawing device according to any one of aspects 1 to 4.

According to the display system for the vehicle in the fifth aspect, the drawing device detects the afterimage-reducing region of the move-target image from the current drawing position to the past drawing position of the move-target image in the display screen of the display unit, and draws the afterimage-reducing image in the detected afterimage-reducing region and also draws the move-target image at the current drawing position. Accordingly, the region in which the move-target image has been drawn in the past is regarded as the afterimage-reducing region, and the afterimage-reducing image can be displayed in the afterimage-reducing region.

Advantageous Effects of Invention

According to the drawing device in the first aspect as explained above, the region in which the move-target image is drawn in the past is considered as the afterimage-reducing region, and the afterimage-reducing images are displayed in the afterimage-reducing region. Thus, it becomes possible by the afterimage-reducing region to reduce that the past move-target image is viewed as an afterimage, and therefore, the viewer can easily view the move-target image. Moreover, since it only has to draw the afterimage-reducing images in the afterimage-reducing region, the load of the drawing process can be reduced. Accordingly, since it is possible to reduce the afterimage of the move-target image which moves fast even if the display unit having a slow response is used, the display can be performed without a feeling of strangeness and a flickering.

According to the second aspect, the previous move-target image is erased in response to the identification of the drawing positions. Thus, it becomes possible to prevent more surely that the past move-target image is viewed as an afterimage even in the display unit having a slow response drawing. Accordingly, the visibility can be enhanced.

According to the third aspect, the afterimage-reducing region is divided into the plurality of afterimage-reducing divided regions, and each of the divided afterimage-reducing images to be drawn in the plurality of afterimage-reducing divided regions is drawn so that its gradation is reduced step-by-step as it gets away from the move-target image. Thus, even if the moving speed of the move-target image is increased, it is possible to easily recognize the moving direction of the move-target image and the drawing positions. Accordingly, the viewer can determine the position of the move-target image instantly.

Further, according to the fourth aspect, each of the divided afterimage-reducing images to be drawn in the plurality of afterimage-reducing divided regions is drawn so that its gradation is reduced gradually as it comes close to a rotational center of the pointer. Thus, the load of the drawing process closer to the rotational center of the pointer can be reduced. Accordingly, the visibility can be enhanced even if the low-cost display unit having the slow response drawing.

According to the display system for the vehicle in the fifth aspect, the drawing device considers the region in which the move-target image is drawn in the past on the display screen in the display unit as the afterimage-reducing region, and displays the afterimage-reducing images in the afterimage-reducing region. Thus, it becomes possible by the afterimage-reducing region to reduce that the past move-target image is viewed as an afterimage, and therefore, the viewer can easily view the move-target image. Moreover, since it only has to draw the afterimage-reducing images in the afterimage-reducing region, the load of the drawing can be reduced. Accordingly, since it is possible to reduce the afterimage of the move-target image which moves fast even if the display unit having a slow response is used, the display can be performed without a feeling of strangeness and a flickering. Further, since it is possible to reduce the load of the drawing process by the drawing device, the reduction in heat and noise emission can be achieved. Thus, it can be used as a vehicle-component.

DESCRIPTION OF EMBODIMENTS

Hereinafter, one embodiment of a drawing device for drawing a move-target image and a display system for a vehicle according to the invention is described with reference to drawings of FIG. 1 to FIG. 8.

Figure 2:
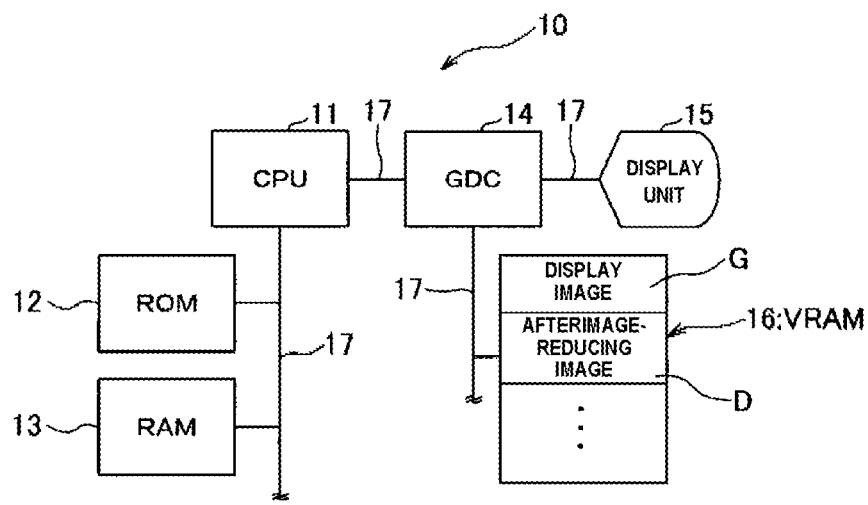
FIG. 2 is a block diagram for showing a schematic configuration of the drawing device for drawing the move-target image according to the embodiment of the invention.

In FIG. 2, a display system 1 for a vehicle includes a drawing device 10 for drawing a move-target image. The drawing device 10 for drawing the move-target image includes a central processing unit (CPU) 11 which executes various processes and controls in accordance with preset programs, a ROM 12 corresponding to a read-only memory in which the programs and the like for CPU 11 are stored, a RAM 13 corresponding to a readable and writable memory in which the various data is stored and which has an area necessary for a work of the processes by CPU 11, a GDC (Graphic Display Controller) 14, a display unit 15, and a VRAM (Video Random Access Memory) 16.

To the CPU 11 are connected the ROM 12, RAM 13 and GDC 14 through buses 17 so as to input and output the various data thereto. To the GDC 14 are connected the display unit 15 and the VRAM 16 through buses 17 so as to input and output the various data thereto.

Figure 3:
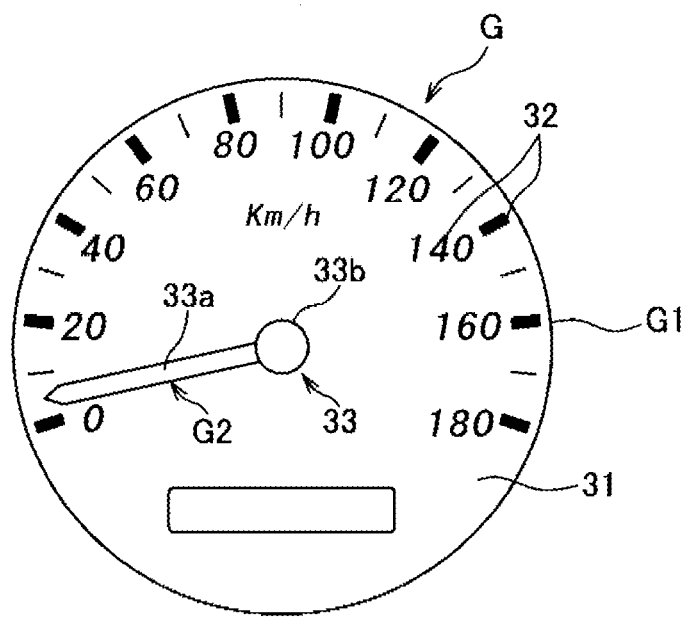
FIG. 3. shows one example of display screen which corresponds to a speed meter.

The ROM 12 memorizes the programs and the like for controlling the overall processes in the drawing device 10 for drawing the move-target image which is assembled, for example, in a graphic meter. The CPU 11 executes the program, and then outputs a display request for a desired display image to the GDC 14. In the embodiment, as shown in FIG. 3, a case for a display image G as a speed meter is described. Alternatively, in a case of a graphic meter for a vehicle, various display images such as a tachometer and a fuel level meter may be considered. The CPU 11 acquires speed data of the vehicle from a speed sensor, etc. in the vehicle and detects a speed, and then requests the GDC 14 to display the speed.

Figure 1:
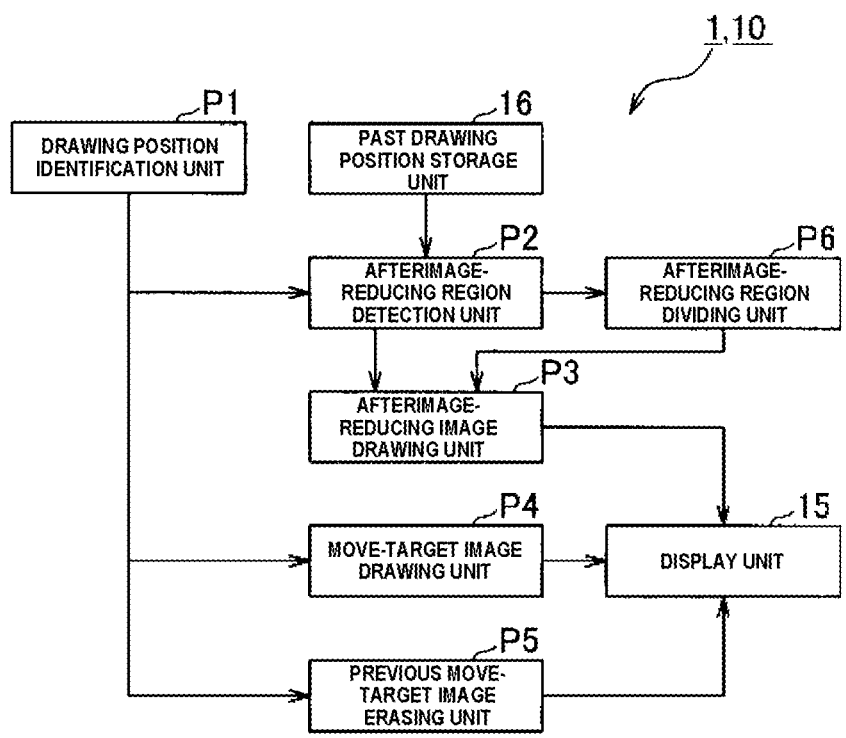
FIG. 1 is a block diagram for showing a drawing device for drawing a move-target image and a display system for a vehicle according to an embodiment of the invention.

Upon receiving the display request, the GDC 14 displays the display image G on the display unit 15 by drawing the display image G on the display unit 15 based on data of the VRAM 16. The GDC 14 stores a drawing processing program described later into an embedded memory. In this embodiment, a case is described where, by executing the drawing processing program, the GDC 14 functions as a drawing position identification unit P1, an afterimage-reducing region detection unit P2, an afterimage-reducing image drawing unit P3, a move-target image drawing unit P4, a previous move-target image erasing unit P5, an afterimage-reducing region dividing unit P6 in claims as shown in FIG. 1. Alternatively, an embodiment can be considered in which the GDC 14 functions as a part of these units and the CPU 11 functions as a remaining part. Although this embodiment describes a case for reducing the work to be executed by the CPU 11 by making the GDC 14 perform the drawing, the present invention is not limited thereto, and it may be applied to an embodiment for the CPU 11 to directly perform the drawing control.

Figure 5:
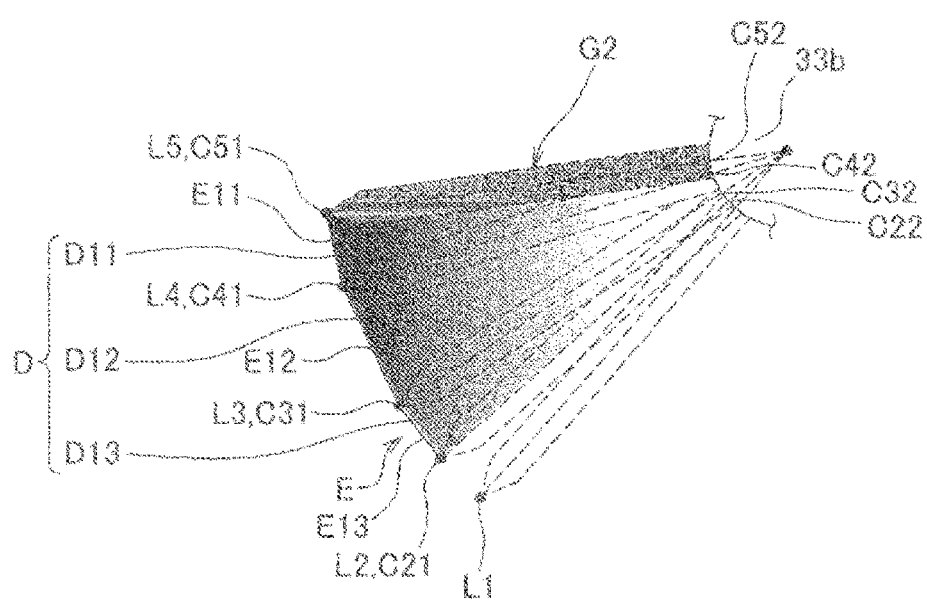
FIG. 5 is a diagram for illustrating one example of the move-target image and an afterimage-reducing image.

The display unit 15 corresponds to a display unit 15 shown in FIG. 5. As the display unit 15, a dot matrix type liquid crystal display device is used which turns ON/OFF units of display (pixels) which are arranged in a matrix in a plane to draw characters or figures on the display screen. The display unit 15 is configured to display the display image G by turning ON/OFF the pixels by the control of the GDC 14. Alternatively, the display unit 15 may be achieved by any display device such as an organic EL (Electro Luminescence) element, an inorganic EL element, a Vacuum Fluorescent Display (VFD), or a Field Emission Display (FED).

The VRAM 16 corresponds to a past drawing position storage unit 16 shown in FIG. 1. As is commonly known, the VRAM 16 is a memory for holding and storing contents to be displayed on the display unit 15. The VRAM 16 memorizes the display image G as described before and an afterimage-reducing image D as shown in FIG. 2. The display image G is constituted by a plurality of images corresponding to a plurality of layers.

The display image G of this embodiment includes, as shown in FIG. 3, a design image G1 and a move-target image G2. The display image G is displayed by overlapping the move-target image G2 on the design image G1 and changing the move-target image G2 of the display image G. That is, a pointing part 33a of a pointer 33 is displayed while being rotated (moved) to a designated position according to a measured amount by changing the move-target image G2.

The design image G1 corresponds to image data which indicates a dial (background) 31 of a speed meter and an index 32 such as scale and figures. The move-target image G2 corresponds to image data which indicates the pointer 33. The pointer 33 includes the pointing part 33a which indicates the index 32, and a base part 33b as a rotational center of the pointing part 33a.

Figure 4:
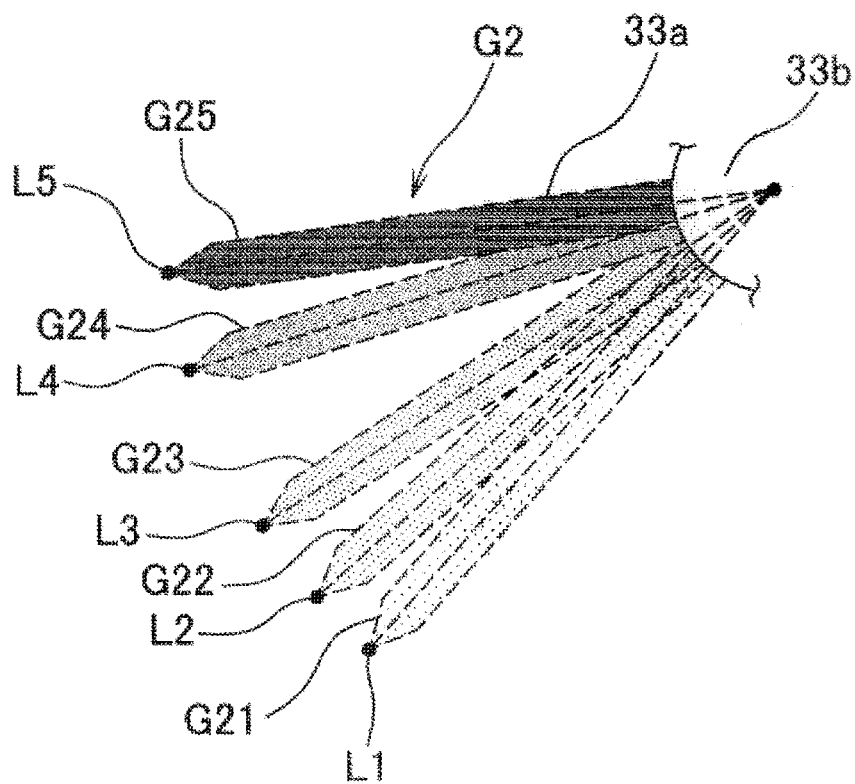
FIG. 4 is a diagram for illustrating a relation between the move-target image and drawing positions.

As shown in FIG. 4, the move-target image G2 is represented by a plurality of pointing position images G21 to G25. The pointing position images G21 to G25 corresponding to designated positions requested by the CPU 11 are drawn on the display unit 15. In FIG. 4, although only five images are shown in order to simplify the explanation, the number of images can be determined arbitrarily. FIG. 4 shows image data in which the pointing position image G21 corresponds to a drawing position L1 at 28 k/m, the pointing position image G22 corresponds to a drawing position L2 at 33 k/m, the pointing position image G23 corresponds to a drawing position L3 at 38 k/m, the pointing position image G24 corresponds to a drawing position L4 at 45 k/m, the pointing position image G25 corresponds to a drawing position L5 at 50 k/m. Each of the drawing positions L1 to L5 is not limited thereto, and may be set at any position. In FIG. 4, the pointing position image G25 shown by solid lines is the newest drawing position (a current drawing position) L5, and the pointing position images G21 to G24 shown by broken lines are past drawing positions L1 to L4. Since the VRAM 16 memorizes past drawing positions L1 to L4 corresponding to the predetermined number of past drawings of the move-target image G2, the VRAM 16 functions as the past drawing position storage unit 16 shown in FIG. 1.

In this embodiment, as shown in FIG. 5, it is described a case where a region from the drawing position L5 to the past drawing position L2 is assumed as an afterimage-reducing region E of the move-target image G2. That is, the afterimage-reducing region E includes the past drawing positions L2, L3, L4 corresponding to the predetermined number (three times in FIG. 5) of past drawings of the move-target image G2. The predetermined number of drawings is not limited to three times, and is arbitrarily set in accordance with a drawing response of the display unit 15, change (move) amounts of the move-target image G2, etc. That is, the afterimage-reducing region E becomes a region from the drawing position L5 to any of the past drawing positions (L1 to L4).

The afterimage-reducing image D corresponds to image data for reducing afterimage of the past drawing positions L2, L3, L4. The afterimage-reducing image D can be arbitrarily determined as a background image or cancel image, etc., for example, in accordance with a drawing response of the display unit 15, etc. As shown in FIG. 5, the afterimage-reducing image D includes a plurality of divided afterimage-reducing images D11 to D13. The afterimage-reducing region E is divided into a plurality of afterimage-reducing divided regions E11 to En on the basis of the drawing position L5 and the plurality of past drawing positions L2 to L4. As an example of the division method, in each of the drawing position L5 and the plurality of past drawing positions L2 to L4, coordinates of two points (a head and a root, etc.) lying on a center line of the pointing part 33a of each pointer 33 are calculated.

For example, in the drawing position L5, coordinate C51 of the head is set as (x10, y10), coordinate C52 of the root is set as (x20, y20). In the drawing position L4, coordinate C41 of the head is set as (x11, y11), coordinate C42 of the root is set as (x21, y21). In the drawing position L3, coordinate C31 of the head is set as (x12, y12), coordinate C32 of the root is set as (x22, y22). In the drawing position L2, coordinate C21 of the head is set as (x13, y13), coordinate C22 of the root is set as (x23, y23).

The afterimage-reducing divided region E12 is a region in which the coordinates C51, C52, C42, C41 are sequentially connected. The afterimage-reducing divided region E12 is a region in which the coordinates C41, C42, C32, C31 are sequentially connected. The afterimage-reducing divided region E13 is a region in which the coordinates C31, C32, C22, C21 are sequentially connected. When the change amount of the move-target image G2 is small, a region between the first past drawing position and the drawing position L5 may be considered as the afterimage-reducing region E. In this way, by dividing the afterimage-reducing divided region E13, it is possible to form the afterimage-reducing region E having a fan-shape substantially.

The plurality of divided afterimage-reducing images D11 to D13 are image data in shapes corresponding to the plurality of afterimage-reducing divided regions E11 to E13, into which the afterimage-reducing region E is divided, on the basis of the drawing position L5 and the plurality of past drawing positions L2 to L4. Each of the plurality of divided afterimage-reducing images D11 to D13 is image data in which the gradation is reduced step-by-step as it gets away from the move-target image G2. For example, when the move-target image G2 is red, it is set that the red color becomes faint step-by-step from the divided afterimage-reducing image D11 toward the image D13. Further, each of the plurality of divided afterimage-reduced images D11 to D13 is set so that the gradation is reduced gradually as it comes close to a rotational center of the pointer 33.

Figure 6:
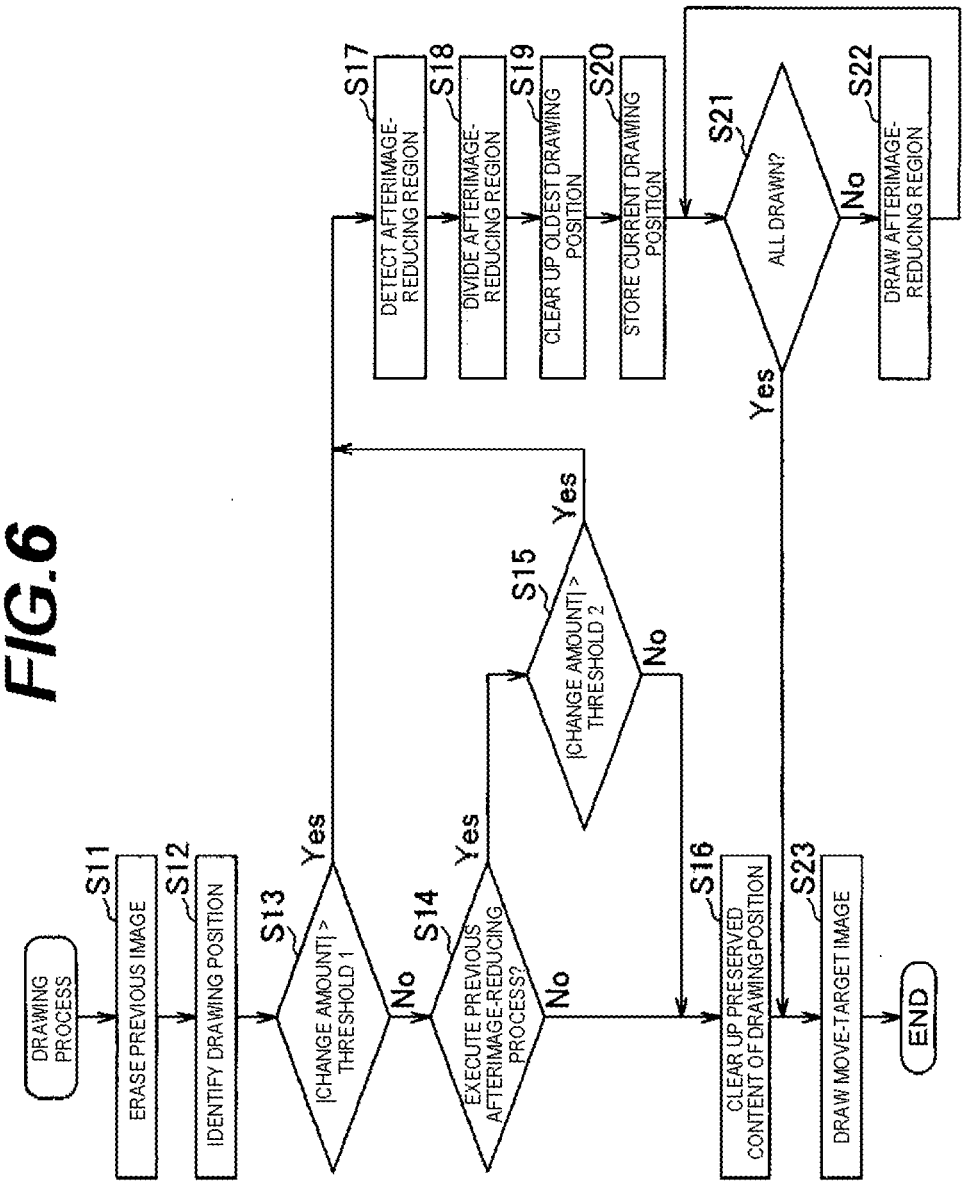
FIG. 6 is a flowchart showing an example of a drawing process which a GDC in FIG. 2 executes.
Figure 7:
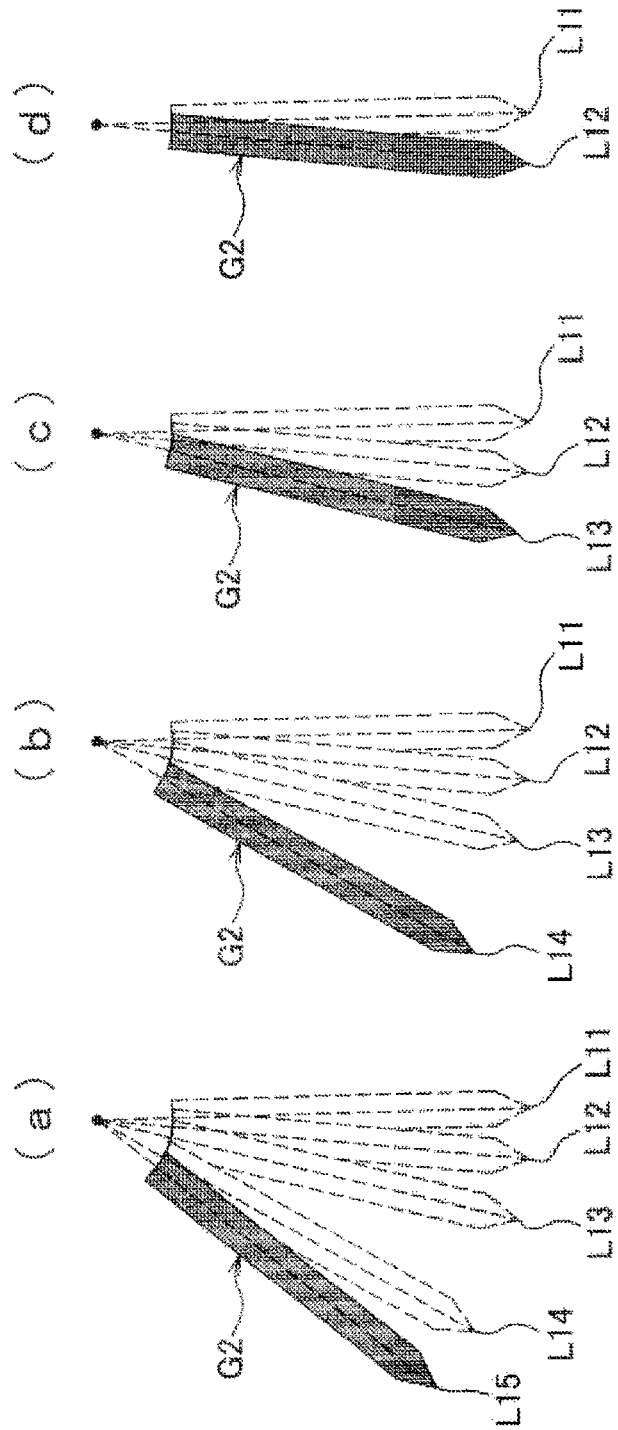
FIG. 7 shows a moving example of the move-target image.

Next, a description is made of an example of a drawing process program which the GDC 14 executes with reference to a flowchart shown in FIG. 6. It is assumed that the drawing process program is initiated in accordance with an input of the pointing position from the CPU 11. Further, it is assumed that the design image G1 is always drawn on the display unit 15.

In step S11, the GDC 14 (the previous move-target image erasing unit P5 in FIG. 1) stores pointing position data, a drawing position L5 and afterimage-reducing divided regions E11 to E13 into the VRAM 16, an embedded memory and the like. Then, a request for erasing a move-target image G2 displayed on the drawing position L5 and divided afterimage-reducing images D11 to D13 displayed on the previous afterimage-reducing divided regions E11 to E13 is issued with respect to the display unit 15, and then the process proceeds to step S12. According to this process, the display unit 15 starts to erase the divided afterimage-reducing images D11 to D13 on the afterimage-reducing divided regions E11 to E13.

In the step S12, the GDC 14 (the drawing position identification unit P1 in FIG. 1) identifies a new drawing position L5 based on the pointing position data, and calculates a change amount from the new drawing position L5 to the previous drawing position L5, and then the process proceeds to step S13. In this embodiment, although a case where the change amount is a difference between the previous drawing position and the new drawing position is explained, alternatively, other embodiments in which change amount is a difference between the second last or the third last drawing position and the new drawing position may be considered. Further, if the target device is a speed meter, the change amount can be calculated from the speed value.

In the step S13, the GDC 14 determines whether the change amount is greater than a preset first threshold. If it is determined that the change amount is not greater than the first threshold (No in S13), the process proceeds to step S14. In the step S14, the GDC determines whether the previous afterimage-reducing process has been executed or not based on a flag of afterimage-reducing process being associated with the pointing position data. If it is determined that the previous afterimage-reducing process has not been executed (No in S14), the process proceeds to step S16. On the other hand, if it is determined that the previous afterimage-reducing process (continuous process of steps S17 to S22) has been executed (Yes in S14), the process proceeds to step S15.

In the step S15, the GDC 14 determines whether the change amount is greater than second threshold or not. Since the second threshold is set to be smaller than the first threshold (the first threshold>the second threshold), hysteresis is given to the drawing. Then, if it is determined that the change amount is not greater than the second threshold (No in S15), the drawing position L5 and the afterimage-reducing divided region E11 to E13 are cleared up in the step S16, and then the process proceeds to step S23.

Further, in the step S15, if the GDC 14 (the afterimage-reducing region detection unit P2 in FIG. 1) determines that the change amount is greater than the second threshold (Yes in S15), in step S17, the GDC 14 detects a new afterimage-reducing region E of the move-target image G2 from the drawing position L5 to the previous drawing position L2 on the basis of the previous drawing positions L4, L3, L2, etc., and associates the pointing position data with the flag of afterimage-reducing process. Then, in step S18, the GDC 14 (the afterimage-reducing region dividing unit P6 in FIG. 1) divides the afterimage-reducing region E into afterimage-reducing divided regions E11 to E13 on the basis the drawing positions L4, L3, etc. Further, the GDC 14 generates the divided afterimage-reducing images D11 to D13 corresponding to each of the afterimage-reducing divided regions E11 to E13, and then the process proceeds to step S19.

In the step S19, the GDC 14 clears up the oldest drawing position L1 stored in the VRAM 16, and modifies the past drawing positions L2 to L5 as new drawing positions L1 to L4 and stores them. In step S20, the GDC 14 stores the current drawing position L5 into the VRAM 16, and then the process proceeds to step S21.

In the step S21, the GDC 14 determines whether all of the divided afterimage-reducing images D11 to D13 which are calculated at this time has been drawn or not. When it is determined that all has not been drawn (No in S21), in step S22, the GDC 14 (the afterimage-reducing image drawing unit P3 in FIG. 1) sequentially requests the display unit 15 to draw the divided afterimage-reducing images D11 to D13 which are calculated at this time, and then the process returns to the step S21, and repeats the continuous process. According to the process in the step S22, the display unit 15 sequentially draws each of the divided afterimage-reducing images D11 to D13 in the respective afterimage-reducing divided regions E11 to E13.

Further, in the step S21, if it is determined that all of the divided afterimage-reducing images D11 to D13 has been drawn (Yes in S21), in step S23, the GDC 14 (the move-target image drawing unit P4 in FIG. 1) requests the display unit 15 to display the move-target image G2 with respect to the current drawing position L5, and then the process ends. According to the step S23, the display unit 15 draws the move-target image G2 at the current drawing position L5 so as to be overlapped with a part of the divided afterimage-reducing image D11.

Since the GDC 14 executes the drawing process program as explained above, the GDC 14 functions as the drawing position identification unit P1, the afterimage-reducing region detection unit P2, the afterimage-reducing image drawing unit P3, the move-target image drawing unit P4, the previous move-target image erasing unit P5, and the afterimage-reducing region dividing unit P6 as shown in FIG. 1.

Next, a description is made of an example of operation (action) of the drawing device 10 for drawing the move-target image in the display system 1 for the display vehicle as described above with reference to drawing of FIGS. 7 and 8. In detail, a description is made of a case where the move-target image G2 mentioned above is drawn at a drawing position L15 in (a) of FIG. 7 when the state is changed in order of (d), (c), (b) and (a) in FIG. 7 in response to the change in vehicle speed.

In the drawing device 10 for drawing the move-target image, when the move-target image G2 at the drawing position L15 is drawn on the display unit 15, previous drawing position L11 to L14 are stored in the VRAM 16. First, the drawing device 10 for drawing the move-target image identifies the drawing position L15, and detects an afterimage-reducing region E corresponding the drawing position L15. Here, it is explained in a case where the afterimage-reducing region E is calculated based on the past three drawing positions L12 to L14. The drawing device 10 for drawing the move-target image detects a rotation range of the pointing part 33a of the pointer 33 disposed between the drawing position L15 and the past drawing position L12 as the afterimage-reducing region E.

Figure 8:
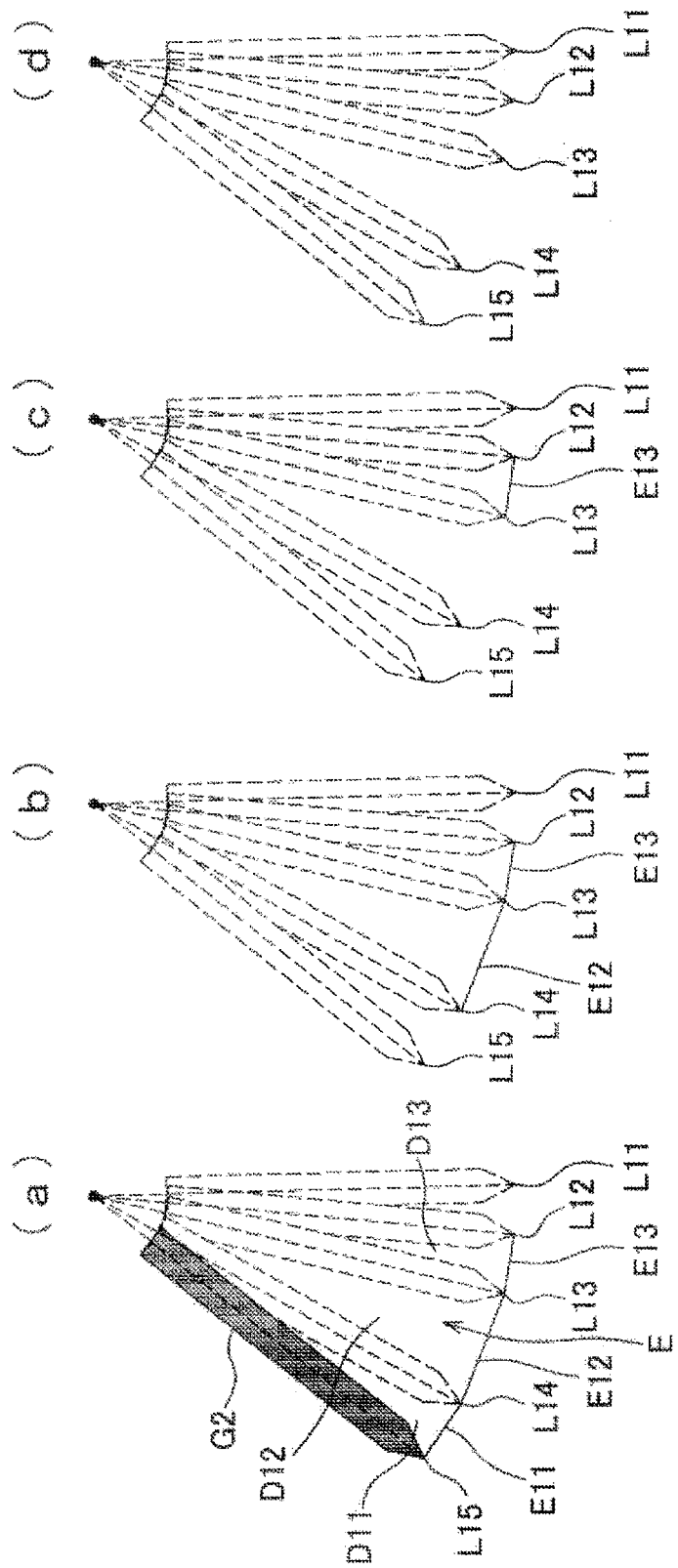
FIG. 8 is a diagram for illustrating a relation between the move-target image which corresponds to the moving example in FIG. 7 and the afterimage-reducing image.

When the afterimage-reducing region E is to be divided into three regions, the drawing device 10 for drawing the move-target image determines a region between the past drawing positions L12, L13 as an afterimage-reducing divided region E13 shown in (c) of FIG. 8. Then, the drawing device 10 for drawing the move-target image further divides the region E so that a region between the further past drawing positions L13, L14 is determined as an afterimage-reducing divided region E12 shown in (b) of FIG. 8, and a region between the further past drawing positions L14, L15 is determined as an afterimage-reducing divided region E11 shown in (a) of FIG. 8. The drawing device 10 for drawing the move-target image generates the divided afterimage-reducing images D11 to D13 which correspond to the afterimage-reducing divided regions E11 to E13, respectively, as shown in (a) of FIG. 8.

The drawing device 10 for drawing the move-target image sequentially draws the divided afterimage-reducing images D13, D12, D11 in the afterimage-reducing divided regions E13, E12, E11 on the display unit 15, respectively, and then draws the move-target image G2 at the drawing position L15 on the display unit 15. As a result, in the display unit 15 of the drawing device 10 for drawing the move-target image, the move-target image G2 is displayed, and also the divided afterimage-reducing images D11, D12, D13 are displayed continuously to the move-target image G2 in a direction opposite to the moving direction of the move-target image G2. Thereafter, the drawing device 10 for drawing the move-target image performs the above operation continuously in accordance with a predetermined measuring timings, etc.

According to the drawing device 10 for drawing the move-target image as explained above, the region in which the move-target image G2 is drawn in the past is considered as the afterimage-reducing region E, and the afterimage-reducing images D11 to D13 are displayed in the afterimage-reducing region E. Thus, it becomes possible by the afterimage-reducing region E to reduce that the past move-target image G2 is viewed as an afterimage, and therefore, the viewer can easily view the move-target image G2. Moreover, since the GDC 14 only has to draw the afterimage-reducing images D11 to D13 in the afterimage-reducing region E, the load of the drawing process in the GDC 14 can be reduced. Accordingly, since it is possible to reduce the afterimage of the move-target image G2 which moves fast even if the display unit having a slow response is used, the display can be performed without a feeling of strangeness and a flickering. Further, since it is possible to reduce the load of the drawing process by the drawing device 10 for drawing the move-target image according to an aspect of the invention, the reduction in heat and noise emission can be achieved. Thus, it can be used as a vehicle-component.

Further, according to the drawing device 10 for drawing the move-target image, the previous move-target image G2 is erased in response to the identification of the drawing positions L5, L15, etc. Thus, it becomes possible to prevent more surely that the past move-target image G2 is viewed as an afterimage even in the display unit 15 having a slow response drawing. Accordingly, the visibility can be enhanced.

Moreover, according to the drawing device 10 for drawing the move-target image, the afterimage-reducing region E is divided into the plurality of afterimage-reducing divided regions E11 to E13, and each of the divided afterimage-reducing images D11 to D13 to be drawn in the plurality of afterimage-reducing divided regions E11 to E13 is drawn so that its gradation is reduced step-by-step as it gets away from the move-target image G2. Thus, even if the moving speed of the move-target image G2 is increased, it is possible to easily recognize the moving direction of the move-target image G2 and the drawing positions L5, L15. Accordingly, the viewer can determine the position of the move-target image G2 instantly.

Further, according to the drawing device 10 for drawing the move-target image, each of the divided afterimage-reducing images D11 to D13 to be drawn in the plurality of afterimage-reducing divided regions E11 to E13 is drawn so that its gradation is reduced gradually as it comes close to a rotational center of the pointer 33. Thus, the load of the drawing process closer to the rotational center of the pointer 33 can be reduced. Accordingly the visibility can be enhanced even if the low-cost display unit having the slow response drawing.

In the above embodiment, a description is made of a case where the afterimage-reducing region E is divided. Alternatively, any embodiment in which the division is not performed when the change amount is small, or the number of division is varied can be considered. Further, in the above embodiment, since the afterimage-reducing divided regions E11 to E13 are detected based on the past drawing positions, the areas of the divided regions are different from one another. In this case, if the number of divided regions is too many, the substantially trapezoidal shape is prominent. Thus, an embodiment in which the divided regions are further divided can be considered.

Further, in the above embodiment, although a description is made of a case where the drawing device 10 for drawing the move-target image is applied to the display system 1 for the vehicle, the invention is not limited thereto. For example, the drawing device 10 for drawing the move-target image can be applied to various display units for drawing a pointer in a game machine, a meter for air plane, audio power meter, a measuring equipment such as a pressure meter or a flow meter, etc.

The embodiments as mentioned above are merely indicated for showing representative forms of the present invention, and the present invention is not limited to the embodiments. That is, it can be implemented by various variations and modifications without departing from the spirit and the scope of the present invention.

INDUSTRIAL APPLICABILITY

According to the drawing device for drawing the move-target image and the display system for the vehicle in an aspect of the invention, it is possible to reduce the afterimage of the move-target image which moves fast even if a display unit having a slow response is used, and they can be applied to the various display unit which draws a pointer.

REFERENCE SIGNS LIST

1: Display system for vehicle
10: Drawing device for drawing move-target image
14: GDC
15: Display unit
16: VRAM
D: Afterimage-reducing image
G: Display image
G2: Move-target image

What is claimed is:

1. A drawing device for continuously drawing a move-target image as a moving picture on a display image displayed on a display unit, the drawing device comprising:
    a drawing position identification unit which is configured to identify a current drawing position at which the move-target image is drawn on the display screen;
    a past drawing position storage unit in which is stored a plurality of past drawing positions where the move-target image is drawn previously;
    an afterimage-reducing region detection unit which is configured to detect an afterimage-reducing region of the move-target image;
    an afterimage-reducing image drawing unit which is configured to draw an afterimage-reducing image in the afterimage reducing region;
    a move-target image drawing unit which is configured to draw the move-target image at the current drawing position; and
    an afterimage-reducing region dividing unit which is configured to divide the afterimage-reducing region into a plurality of afterimage-reducing divided regions, wherein
    the afterimage-reducing image drawing unit draws each of divided afterimage-reducing images to be drawn in the plurality of afterimage-reducing divided regions so that its gradation is reduced step-by-step as it gets away from the move-target image, and wherein
    the afterimage-reducing region dividing unit selects a first past drawing position from the plurality of past drawing positions, the afterimage-reducing region extending from the current drawing position to the selected first past drawing position, and
    the afterimage-reducing region dividing unit selects one or more second past drawing positions from the plurality of past drawing positions, the one or more second past drawing positions existing between the first past drawing position and the current drawing position, wherein the plurality of afterimage-reducing divided regions are based on the current drawing position, the first past drawing position and the one or more second past drawing positions.

2. The drawing device according to claim 1, comprising:
    a previous move-target image erasing unit which is configured to erase a previous move-target image in accordance with an identification of the current drawing position performed by the drawing position identification unit.

3. The drawing device according to claim 1, wherein
    the move-target image is an image which indicates a display of rotating a pointer, and
    the afterimage-reducing image drawing unit draws each of divided afterimage-reducing images to be drawn in the plurality of afterimage-reducing divided regions so that its gradation is reduced gradually as it comes close to a rotational center of the pointer.

4. A display system for a vehicle comprising the drawing device according to claim 1.

5. The drawing device according to claim 1, wherein
    the plurality of afterimage-reducing divided regions are generated based on coordinates of the current drawing position and the plurality of stored past drawing positions.

6. The drawing device according to claim 1, wherein
    the plurality of afterimage-reducing divided regions are generated by dividing the afterimage-reducing region with a center line connecting a root and a head of each of the plurality of stored past drawing positions.

7. The drawing device according to claim 1, wherein
    the plurality of afterimage-reducing divided regions at least includes a first divided region between the current drawing position and the one or more second past drawing positions, and a second divided region between the first past drawing position and the one or more second past drawing positions.

* * * * *